United States Patent
Williams et al.

(10) Patent No.: US 12,011,865 B2
(45) Date of Patent: Jun. 18, 2024

(54) REMOVING WRINKLES ADJACENT TO A JOINT

(71) Applicant: Lear Corporation, Southfield, MI (US)

(72) Inventors: Kevin L. Williams, Lapeer, MI (US); Andrew Williams, Warwickshire (GB); Christopher Giles Humphrey, West Midlands (GB); Mark Ramsden, Alcester (GB)

(73) Assignee: Lear Corporation, Southfield, MI (US)

( * ) Notice: Subject to any disclaimer, the term of this patent is extended or adjusted under 35 U.S.C. 154(b) by 425 days.

(21) Appl. No.: 17/326,958

(22) Filed: May 21, 2021

(65) Prior Publication Data

US 2022/0371258 A1    Nov. 24, 2022

(51) Int. Cl.
B29C 53/18    (2006.01)

(52) U.S. Cl.
CPC .................................... B29C 53/18 (2013.01)

(58) Field of Classification Search
None
See application file for complete search history.

(56) References Cited

U.S. PATENT DOCUMENTS

2007/0278864 A1   12/2007  Lai et al.
2016/0039140 A1*   2/2016  Bloch .................... B29C 53/18
                                                               425/150
2019/0120774 A1    4/2019  Whitens et al.
2020/0141049 A1*   5/2020  Clowes .................... D06F 35/00

FOREIGN PATENT DOCUMENTS

CN        112297298 A   *  2/2021
KR        101438540     *  9/2014

OTHER PUBLICATIONS

Machine English translation of KR101438540, Accessed Sep. 21, 23 (Year: 2022).*
Machine English translation of CN-112297298-A, Accessed Sep. 21, 23 (Year: 2021).*
Wu et al., Study on Efficiency of Air Knife as Thermal Insulation with Two Spatial Opening, Proceedings of the 16th IBPSA Conference, Sep. 2-4, 2019.

* cited by examiner

*Primary Examiner* — Jacob T Minskey
*Assistant Examiner* — Adrianna N Konves
(74) *Attorney, Agent, or Firm* — MacMillan, Sobanski & Todd, LLC

(57) ABSTRACT

A system and method for removing a wrinkle adjacent to a joint between a first surface material and a second surface material, different from the first surface material. The system and method may include directing a flow of air creating an air wall across the first surface material adjacent to the joint where the wrinkle is being removed from the second surface material; directing heat onto the wrinkle in the second surface material; and working out the wrinkle from the second surface material while the second surface material is at an elevated temperature.

12 Claims, 3 Drawing Sheets

REMOVING WRINKLES ADJACENT TO A JOINT

BACKGROUND OF THE INVENTION

This invention relates to a system and method for employing a heat source for treatment on a portion of an assembly while employing an air shield on an adjacent portion of the assembly protecting it from unwanted excess heat.

When two different materials are brought together to form a seam, situations may arise where a first one of the materials is defective (e.g., wrinkled) adjacent to the seam. For some of those situations, applying heat (e.g., employing a heat gun to provide heated air) to the wrinkled area may help in removing the wrinkles. However, if the second material adjacent to the seam may be damaged from the heat, a means is needed to block the heat from reaching this second material. Mechanical heat shields are known that provide a means of reducing heat from the heat gun when held over the second material, but are less than satisfactory when used in some situations.

SUMMARY OF THE INVENTION

According to an aspect, the invention provides a method for removing a wrinkle adjacent to a joint between a first surface material and a second surface material, different from the first surface material, the method including: directing a flow of air creating an air wall across the first surface material adjacent to the joint where the wrinkle is being removed from the second surface material; directing heat onto the wrinkle in the second surface material; and working out the wrinkle from the second surface material while the second surface material is at an elevated temperature.

According to an aspect, the invention provides a system for removing a wrinkle adjacent to a joint between a first surface material and a second surface material, different from the first surface material, the system may include: an air knife configured to direct a flow of air creating an air wall across the first surface material adjacent to the joint where the wrinkle is being removed from the second surface material; and a heat gun configured to direct heat onto the wrinkle via heated air, with the heated air having a velocity lower than a velocity of the air flow creating the air wall.

According to an aspect, the invention provides a flow of air to act as an air wall to protect a material on a second side of a joint when heat is applied to a different material on a first side of the joint to help remove wrinkles. According to an aspect, the invention may provide a laser operatively coupled to a heat gun to indicate where a heat application will occur. According to an aspect, the invention may provide a fixture that locates and supports an assembly creating the air wall. According to an aspect, the fixture may comprise a robot that supports the assembly creating the air wall, which robot may be mounted to or configured to follow the heat source during the wrinkle removing process. According to an aspect, the invention may provide multiple heads for producing the flow of air that creates the air wall. According to an aspect, the invention may provide one or more shaped heads for producing the flow of air that creates the air wall to provide a geometry of air flow that better matches the geometry of the joint and surface materials.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
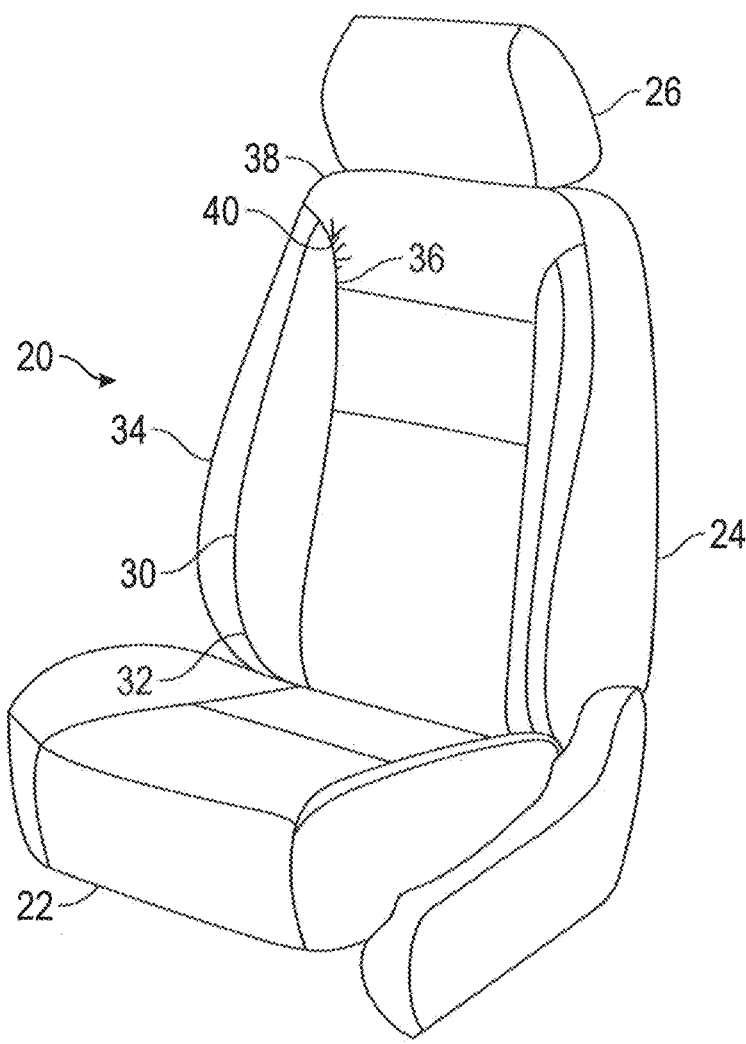
FIG. 1 is a schematic, perspective view of a vehicle seat.
Figure 2:
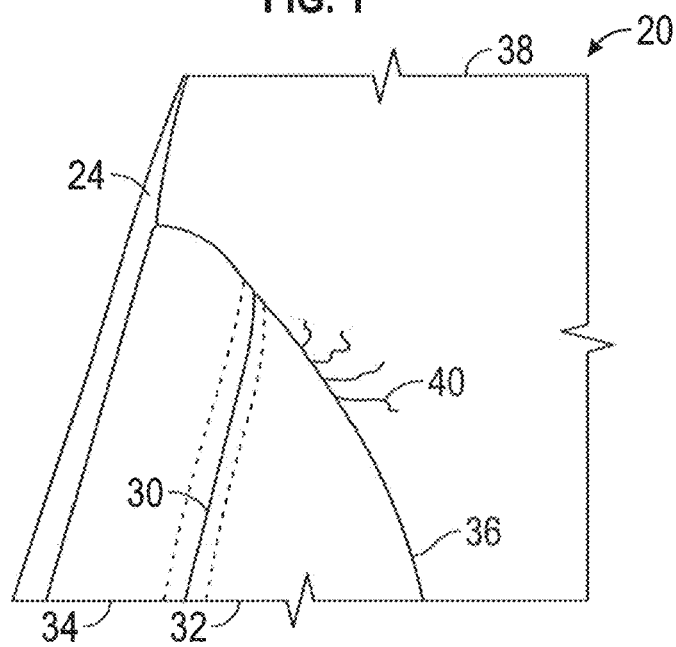
FIG. 2 is a schematic, perspective view of a portion of the vehicle seat of FIG. 1.

Referring now to the drawings, there is illustrated in FIGS. 1 and 2 an assembly having joints bringing together different types of surface material. Joints may be, for example, seams between surface materials secured together (such as different portions of the surface material of a seat back), or intersections between surface materials on different subassemblies that are brought together (such as an intersection between a seat back and a seat bottom). In the example illustrated, a seat 20 (e.g., a vehicle seat) may include a seat bottom 22, a seat back 24 and/or a headrest 26. While most of a seat is illustrated, the process described herein may be applied to only a portion of an assembly (e.g., applied to a seat back or seat bottom prior to assembling this portion of a seat to one or more other subassemblies of a seat) or to other types of assemblies where different types of surface material are brought together at a joint.

The seat 20 may have joints (e.g., seams) 30 that secure together a first 32 and a third 34 piece of surface material, where the two surface materials 32, 34 are the same (or very similar) material (e.g., vinyl). The seat 20 may have joints (e.g., seams) 36 that secure together the first piece of surface material 32 with a second piece of surface material 38, which is a substantially different material (e.g., leather). During the seaming (joint making) as process, wrinkles 40 may be inadvertently created adjacent to the seam (joint) 36. As used herein, wrinkles includes undesirable surface shapes adjacent to the seam (joint), such as for example, puckering, cupping, ridges, bulging or other undesired surface finish that is not smooth (so as to be esthetically pleasing). While the wrinkles 40 are shown in one particular location of the seat 20, they may occur at various locations, and the process for eliminating the wrinkles is applicable to the various locations. Such wrinkles 40 may be esthetically unpleasing and so it is desirable to eliminate the wrinkles 40 without potentially causing damage to any of the surface materials of the assembly.

Figure 3:
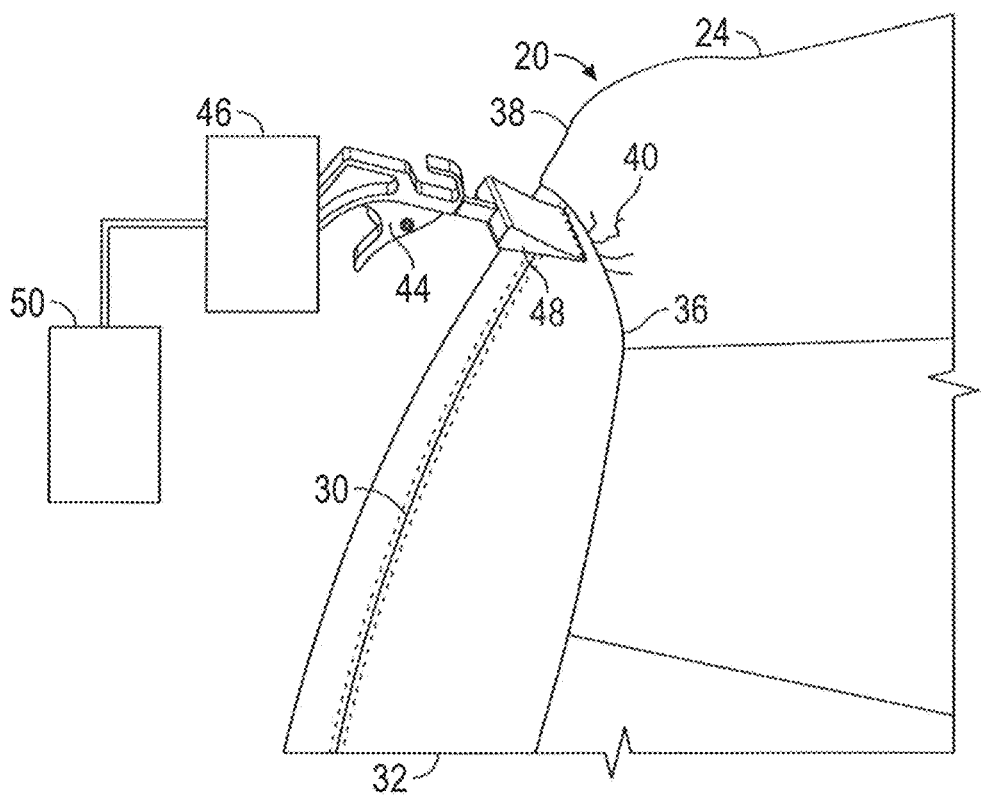
FIG. 3 is a schematic, perspective view of a portion of the vehicle seat with an air knife positioned for applying an air barrier.

Referring now to FIG. 3, in view of FIGS. 1 and 2, a portion of a wrinkle reduction process, using particular tools, is shown, which process is employed to eliminate the wrinkles 40. For elements that are the same or similar to those of FIGS. 1 and 2, the element numbers will be shown in FIG. 3, but the description thereof will not be repeated. An air flow tool 44 (e.g., an air knife) may be connected to a fixture 46 that positions a head 48 of the air flow tool 44 adjacent to the seam (joint) 36 at the location of the wrinkles 40. The air flow tool 44 may comprise various heads 48, which each may be shaped to provide the desired air flow for the geometry of the joint and surface material being protected. The fixture 46 may locate and support the air flow tool 44, as well as supply pressurized air that is directed out through an end of the head 48 toward the seam (joint) 36 to provide high velocity air flow. The fixture 46 may be operatively connected to and controlled by a controller 50. The fixture 46 may comprise a robot configured to be attached to or follow a heat application tool, discussed below, during the process for eliminating wrinkles. Alternatively, the air flow tool 44 may be manually located, manually supported, manually operated, or any combination of these.

Figure 4:
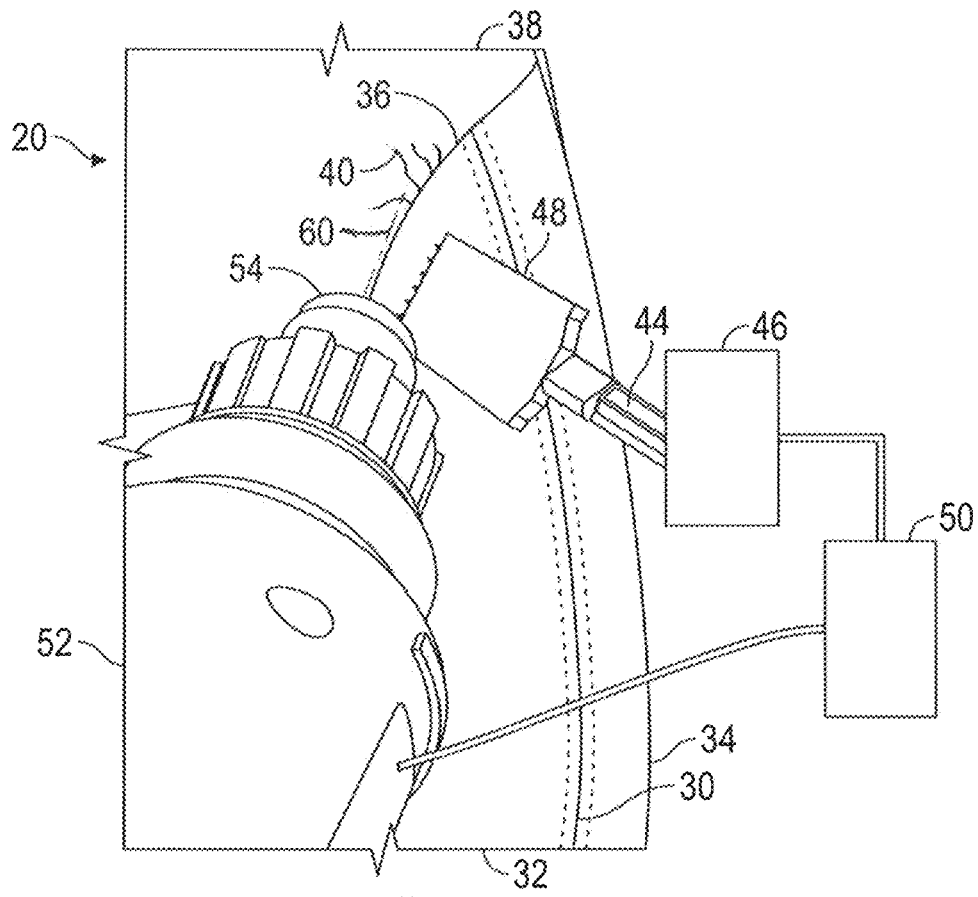
FIG. 4 is a schematic, perspective view of a portion of the vehicle seat with the air knife and a heat gun positioned for reducing wrinkles around a joint.

Referring now to FIG. 4, in view of FIGS. 1-3, another portion of the wrinkle reduction process using the particular tools, is shown. For elements that are the same or similar to those of FIGS. 1-3, the element numbers will be shown in FIG. 4, but the description thereof will not be repeated. Also, while a different portion of the seat 20 is shown, the process is applicable to various joints between various material surfaces of the seat. A heat application tool 52 (e.g., a heat gun) may be connected to a source of energy, such as electricity (not shown), and positioned with a heat application nozzle 54 adjacent to the wrinkles 40. The heat application tool 52 may be configured to provide a low velocity flow of heated air to the wrinkles 40. Additionally, the heat application tool 52 may optionally include a laser indicator 60 to more clearly indicate to a user the location at which the heated air from the tool 52 will be applied.

The process for reducing/eliminating the wrinkles 40 will now be discussed relative to FIGS. 1-4. When undesirable wrinkles 40 are present at a joint between different surface materials, the head 48 of the tool 44 may be positioned (either by hand or employing the fixture 46) adjacent to the seam (joint) 36 and activated to provide a flow of relatively high velocity air. This creates an air barrier (air wall) that limits the exposure of the first surface material (e.g., vinyl) 32 to heat applied to the second surface material (e.g., leather) 38. The heat application nozzle 54 of the application tool 52 may be positioned adjacent to the wrinkles 40 in the second surface material 38 and activated to provide a flow of relatively low velocity heated air onto the second surface material 38. The "low" velocity of air from the heat application tool 52 is relative to the tool 44 creating the air barrier (air wall) with "high" velocity air, wherein the air speed of the two air flows is substantially different. The heat application tool 52 only need provide a low velocity air as the heat in the air is what helps remove wrinkles, while the air flow tool 44 provides high velocity air since it is the air barrier (air wall) formed by this high velocity air that limits the heat from penetrating to the surface of the first surface material 32. As the second surface material 38 is heated, the wrinkles 40 may be worked out of the second surface material 38 until sufficient to provide a desired appearance. Working out wrinkles, as used herein, means stretching, pushing, massaging, or otherwise manipulating the second surface material 38 while this second surface material 38 is at an elevated temperature due to the application of heat from the heat application tool 52. This working out may be done by hand or with tools that manipulate the surface material without damaging the surface material. While the wrinkles are worked out of the second surface material 38, the air barrier (air wall) limits the exposure of the heat from the heat application tool 52 to the first surface material 32, thereby reducing or eliminating any possibility for the first surface material 32 to be damaged (e.g., burned) while wrinkles 40 are being removed. The heat application tool 52 and the tool 44 may be deactivated after the wrinkles 40 are eliminated sufficiently to provide the desired esthetic appearance.

Figure 5:
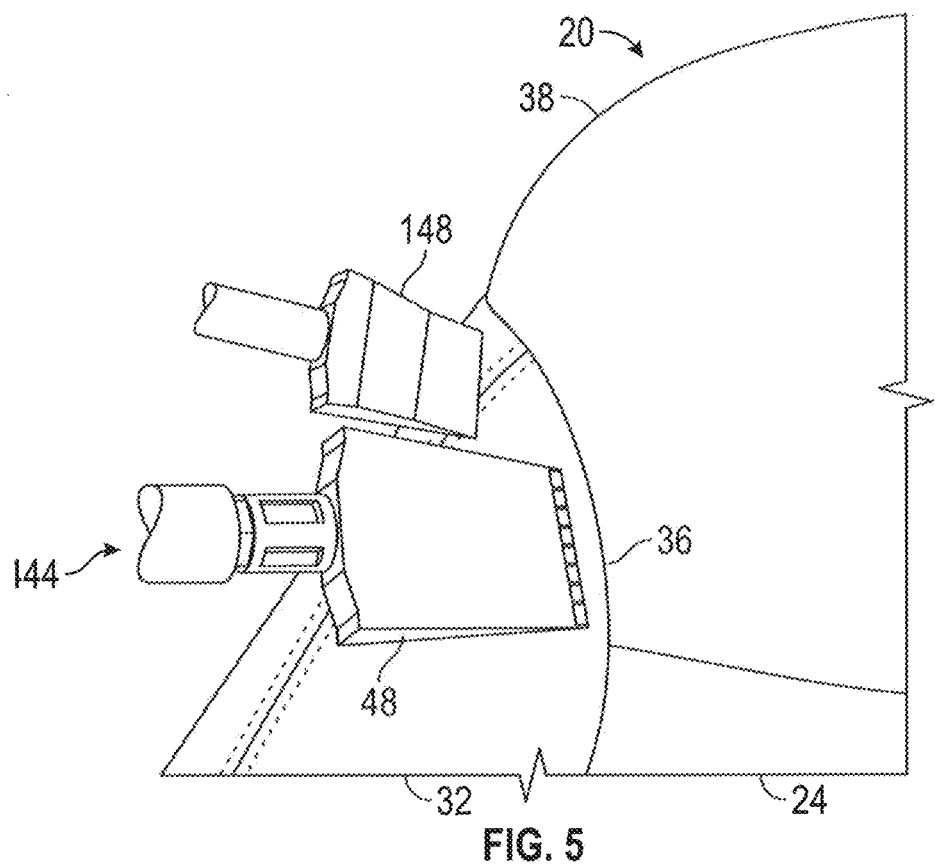
FIG. 5 is a schematic, perspective view of a portion of the vehicle seat with an air knife positioned for applying an air barrier.

Referring now to FIG. 5, which is similar to FIG. 3, the air flow tool 44 may be somewhat different in that multiple air flow tools 44, 144 or an air flow tool 144 having multiple heads 48, 148 may be employed to create a larger or plural air shields during a wrinkle removing process. Since FIG. 5 is similar to FIG. 3, the same element numbers will be used in reference to the same elements but without repeating the description of these elements.

Figure 6:
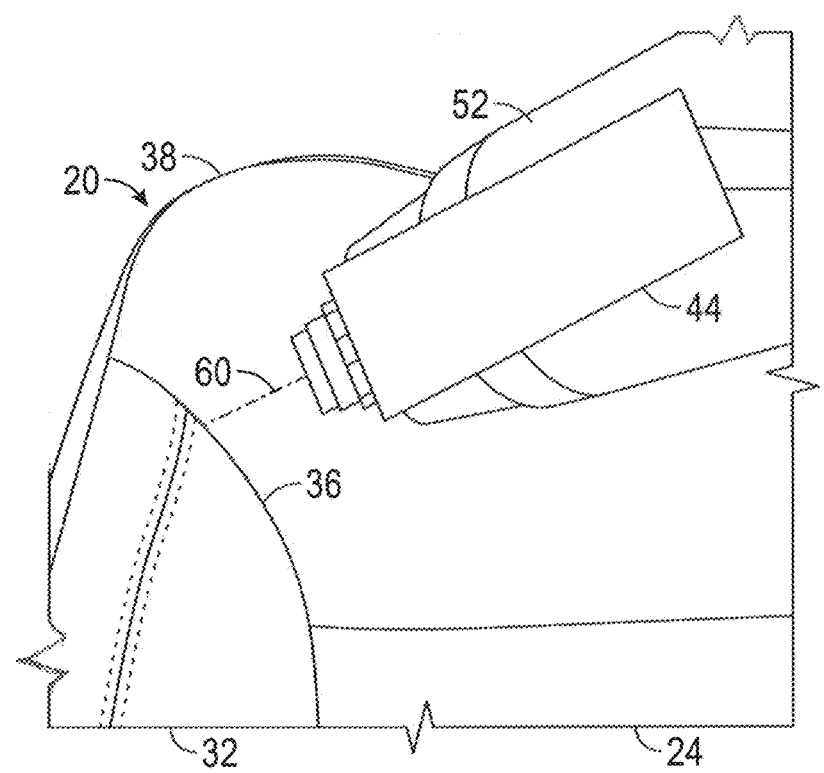
FIG. 6 is a schematic, perspective view of a portion of the vehicle seat with an air knife and a heat gun positioned for reducing wrinkles adjacent to a joint.

Referring now to FIG. 6, which is similar to FIGS. 3 and 4, the air flow tool 44 and the heat application tool 52 may be somewhat different in that the air flow tool 44 may be mounted to the heat application tool 52, allowing the two tools to be positioned as one unit during the wrinkle removing process. A laser indicator 60 may be provided on the heat application tool 52 adjacent to the heat application nozzle 54 to more clearly visually indicate the location at which the heated air from the heat application tool 52 will be applied to the second surface material 38.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method for removing a wrinkle adjacent to a joint between a first surface material and a second surface material, different from the first surface material, the method comprising:
   (a) directing a flow of air creating an air wall across the first surface material adjacent to the joint where the wrinkle is being removed from the second surface material;
   (b) directing heat onto the wrinkle in the second surface material; and
   (c) working out the wrinkle from the second surface material while the second surface material is at an elevated temperature.

2. The method of claim 1 wherein step (b) further comprises employing a heat gun to direct the heat onto the wrinkle via heated air, with the heated air having a velocity lower than a velocity of the air flow creating the air wall.

3. The method of claim 2 wherein step (b) further comprises activating a laser to indicate a location on the second surface material where the heat is being directed from the heat gun.

4. The method of claim 2 wherein step (a) further comprises employing an air knife to direct the flow of air, with the air knife having a head directed toward the first surface material adjacent to the joint.

5. The method of claim 4 wherein step (a) further comprises locating the air wall by positioning the air knife with a fixture.

6. The method of claim 4 wherein the air knife includes a second head directing the flow of air creating the air wall across the first surface material adjacent to the joint.

7. The method of claim 1 wherein step (a) further comprises employing an air knife to direct the flow of air, with the air knife having a head directed toward the first surface material adjacent to the joint.

8. The method of claim 7 wherein step (a) further comprises locating the air wall by positioning the air knife with a fixture.

9. The method of claim 7 wherein the air knife includes a second head directing the flow of air creating the air wall across the first surface material adjacent to the joint.

10. The method of claim 1 wherein the second surface material can withstand higher heat without damage than the first surface material.

11. The method of claim 1 wherein the first and second surface materials are on a seat.

12. The method of claim 1 wherein the first surface material is vinyl, the second surface material is leather, and the joint is a seam securing the vinyl to the leather.

* * * * *